(12) United States Patent
Gross et al.

(10) Patent No.: US 6,372,974 B1
(45) Date of Patent: Apr. 16, 2002

(54) METHOD AND APPARATUS FOR SHARING MUSIC CONTENT BETWEEN DEVICES

(75) Inventors: Mark T. Gross; Robert A. Jacobs, both of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/761,513

(22) Filed: Jan. 16, 2001

(51) Int. Cl.⁷ .................................................. G10H 7/00
(52) U.S. Cl. ............................. 84/609; 84/600; 84/649
(58) Field of Search ........................... 84/600, 601–602, 84/609–610, 634, 645, 649–650, 666; 704/200, 270, 272, 275, 500, 503

(56) References Cited

U.S. PATENT DOCUMENTS 6,192,340 B1 * 2/2001 Abecassis .................... 704/270
6,252,961 B1 * 6/2001 Hogan ........................ 380/37
6,266,685 B1 * 7/2001 Danielson et al. .......... 708/141

* cited by examiner

*Primary Examiner*—Marlon T. Fletcher
(74) *Attorney, Agent, or Firm*—Marger Johnson & McCollom PC

(57) ABSTRACT

A digital music player. The player includes a memory capable of storing music files. The player has a user interface allowing a user to select and access the music files. A port on the player allows the user to establish a connection to other digital music players. The user can then send and receive music files without an intervening host.

15 Claims, 3 Drawing Sheets

METHOD AND APPARATUS FOR SHARING MUSIC CONTENT BETWEEN DEVICES

BACKGROUND

1. Field

This disclosure relates to methods for sharing music between music players, more particularly to methods for sharing music between music players without using a host.

2. Background

Personal electronic devices of all types have become prevalent in everyday use. Cellular phones, personal digital assistants (PDAs), pagers, portable music players such as MP3 (Moving Pictures Expert Group, Layer 3) players, as well as other types of music players can be found everywhere.

With the advent of digital music being readily available, users have a new source of musical content. In most uses, the content resides in relatively small digital files that can be exchanged between users. However, transferring content from one user to another currently involves a host, usually a personal computer or network. One user transfers the file from that user's music player to a host, either a computer or a network. Alternatively, the sending user can use a different host to transfer to the host. The other user can then access the file. Transfers may include making copies of the file.

A problem may arise in the area of copyright protection or content protection. If the music was obtained through use of a secure format, such as SDMI (Secure Digital Music Initiative) or DRM (Digital Rights Management) systems, such as Liquid Audio, interTrust, etc. where the files cannot typically be shared between users. It would therefore be useful, to have a method and apparatus that allowed users to share content directly between music players, as well as to allow them to do so without violating any protection of the content afforded the content creator.

BRIEF DESCRIPTION OF THE DRAWINGS

The invention may be best understood by reading the disclosure with reference to he drawings, wherein.

DETAILED DESCRIPTION OF THE EMBODIMENTS

Sharing of music content between music players typically involves using a host as an intermediary. The host may be some computing device, such as a personal computer, or a server on a network. In addition, the network may act as a host, in the example of music players that may connect directly to the network without using a computer as an intermediary.

Music file exchanges typically involve one user connecting a first music player to a host and uploading the music files to be shared to the host. The second user can then connect a second music player to the host and download that file. If two users are in a situation when they cannot access the host, they are essentially prevented from sharing content.

Figure 1:
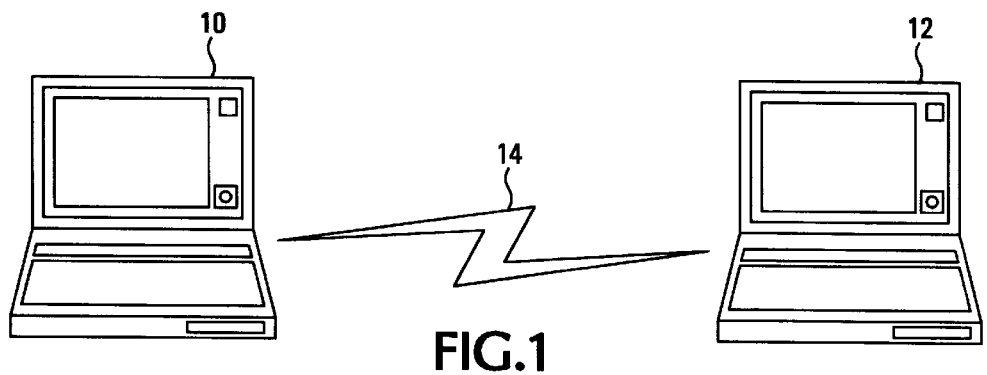
FIG. 1 shows one embodiment of a peer-to-peer connection set up between two portable devices, in accordance with the invention.

FIG. 1 shows one example of a peer-to-peer connection set up between two music players. The music players may be some sort of portable device (PD) such as an MP3 player, as well as a player of other formats of digital music. Alternatively, the music player could be a digital radio or other type of music player that is not necessarily portable. In the connection, music player 10 will be assumed to be the sending music player. Music player 12 will receive music files through the connection 14. The connection could be any type of standardized connection with established protocols, such as infrared (DR), universal serial bus (USB), or other connections wired or wireless.

Figure 2:
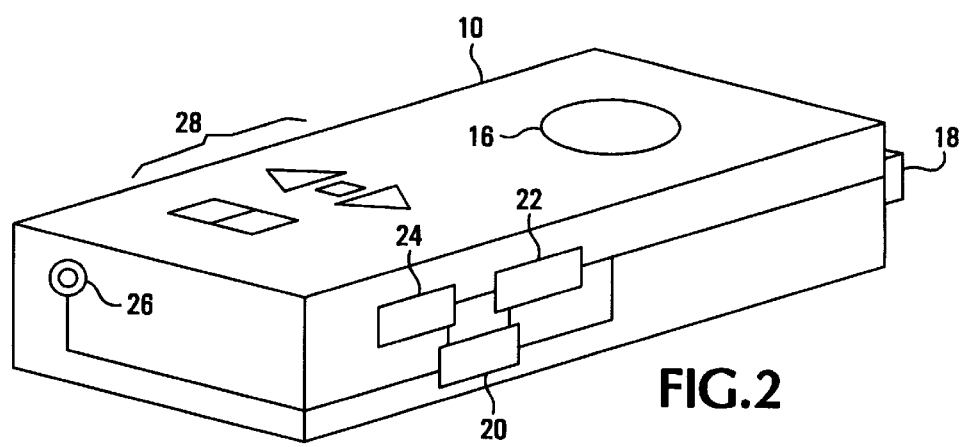
FIG. 2 shows one embodiment of a portable music player in accordance with the invention.

The music player 10 can be seen in more detail in FIG. 2. This may be a portable device or a console. The device may have a user interface comprised of a display 16 and control inputs 28. The control inputs maybe buttons, control knobs, stylus and touch screens, or other input. The user may activate and respond to information on the user interface to control the music player. Tasks may include downloading music files, selecting music files to play, and identifying music files to be transferred to other users or to a host.

The music files played by the player may be digital signals stored in organized formats, such as in accordance with MP3 (Moving Picture Experts Group, Layer 3) protocols or other digital audio format. These signals are converted by the decoder from the stored format into audio signals and played by the player. The conversion may include converting from digital data signals to analog audio signals, in which case the decoder would be a digital-to-analog converter.

In order to perform the conversion, the player may have a decoder 20. The music file will be received through a port 18, which may be one of several different types of ports, as mentioned above. The port 18 may also be the port through which the player connects to hosts for download of music files. The files may be stored in a memory 22.

When the :user wishes to access a file, whether for play or transfer, the user may identify the file through the user interface. If the file is to be played, the file will be accessed from the memory 22, decoded as necessary at the decoder 20 and played. The player may include an audio output such as headphones or a speaker. These accessories are optional, however, all the player 10 may-have is a jack 26 that allows the audio signals to be accessed by some sort of audio output.

Figure 3:
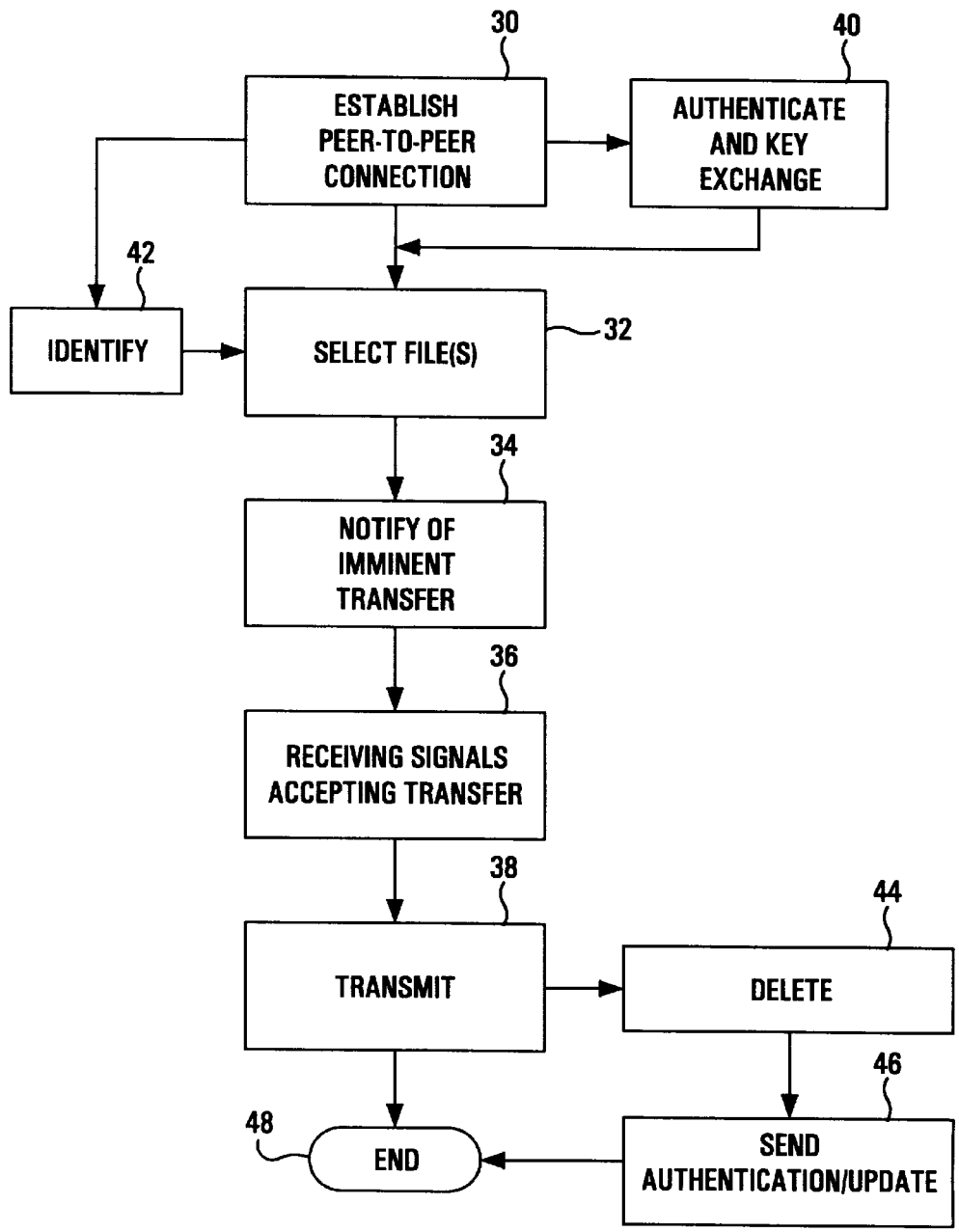
FIG. 3 shows a flowchart of one embodiment of a method to share content between portable devices without the use of a host, in accordance with the invention.

With a device such as the one shown in FIG. 2, user may be able to send and receive music content with other users without the need of a host, referred to as a no-host connection, in accordance with the invention. One embodiment of a method for sending music files with a music player is shown in FIG. 3, in accordance with the invention.

At 30, a no-host, peer-to-peer connection between the two music players is established. At 42, the user may select a file to be transferred. However, this is optional, as there may be only one file on the player to be transferred, or it may have been previously identified. Once the file has been identified by whatever means, the player selects the file or files to be transferred at 32.

At 34, the sending player sends a notification to the receiving player of an imminent file transfer. The sending player then waits for an acknowledgement from the receiving player. When the receiving player sends its readiness to accept the file, the sending player receives these at 36. The sending player then transmits the file or files at 38. The process may end at 48.

However, in accordance with protections being afforded digital content today, this transfer may need to take into account management of the protocols the provide protection. Referring back to 30, then, the process may also handle authentication and cryptographic session keys in a sub-step 40. For secure transactions, this will be considered part of the establishment of the peer-to-peer connection.

Several different guidelines and protocols are in development or use for protection of digital content, especially digital music content. One example is SDMI, the Secure Digital Music Initiative, a guideline for digital music content protection. Others are Digital Rights Management (DRM) systems such as Inter Trust, Liquid Audio, Microsoft WMDM and others, following the DRM guideline for content protection.

One method of transferring the data in accordance with these protections includes a process for removing the file from the sending player after it has been successfully copied to the other player. This can be seen in FIG. 3, after transmission at 38. At 44, the file is deleted from the sending player, after the receiving player validates the transmitted file is complete, authentic (the correct file) and error free by sending a message authentication (a secure hash of the sent bits the host can use to trust that the new data on the receiving PD is what was sent) back to the sending PD. After deletion, the sending player then sends the final authentication code, or title key, for the file to the receiving player at 46. If any error condition occurs the receiving PD deletes any saved bits. In this manner, the transfer will not violate any copyright or security protections, as only one copy will exist at the end of the transaction. These further steps are only necessary when protections exist in the files being transferred.

An alternative is for control of the number of copies. The sending device may have a local storage module that maintains a reference count of copies transmitted. When a copy is transmitted, signals are sent to the local storage module to update data representative of the number of copies as part of the authentication step 46. When the number of copies allowed to be transmitted is reached, no farther transfers will be allowed. Alternatively, the file may be deleted from the sending player.

Figure 4:
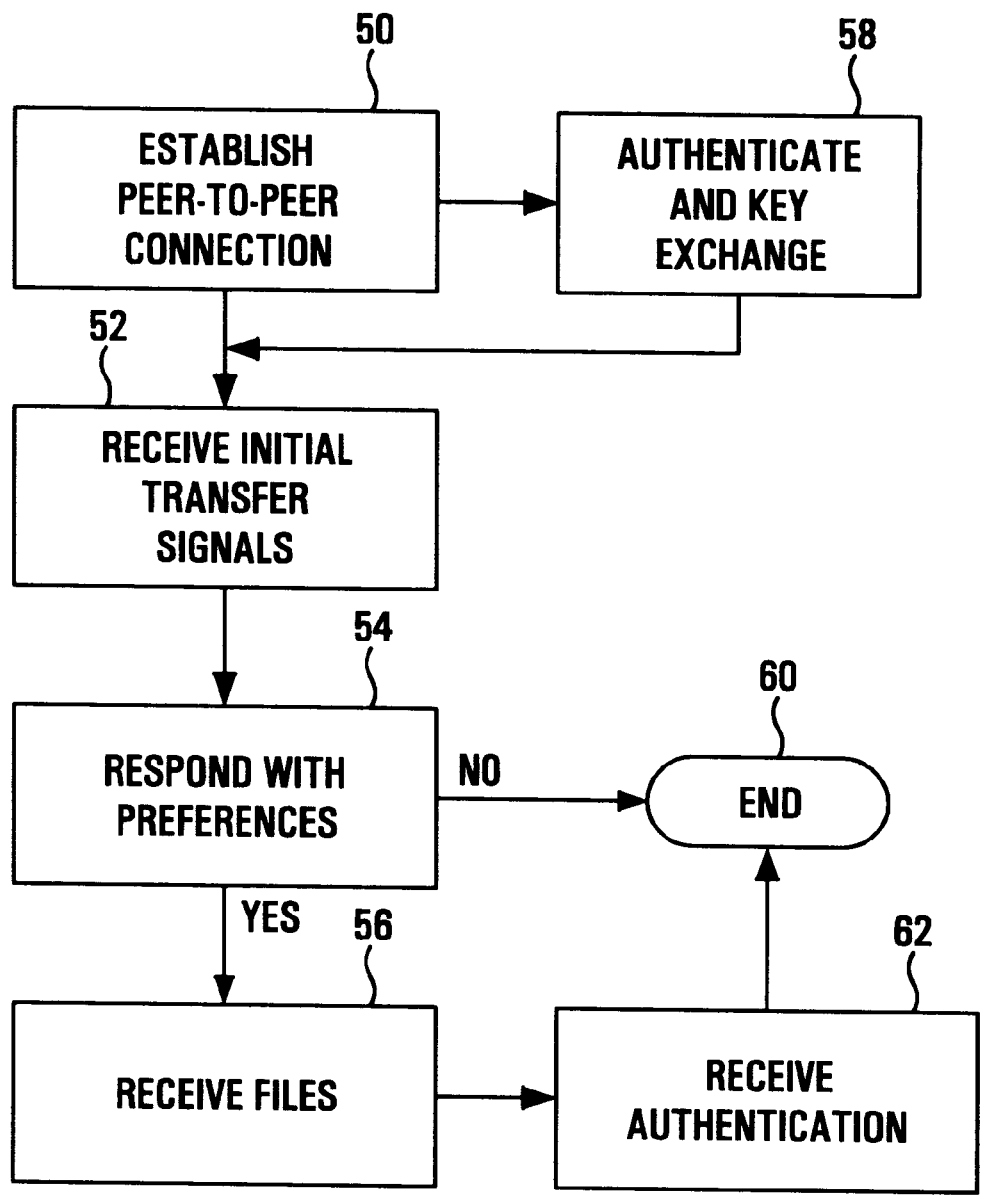
FIG. 4 shows an alternative embodiment of a method to share content between portable devices without the use of a host, in accordance with the invention.

Having seen a file transfer from the sending device, it is now useful to discuss reception of the file. One embodiment of a method to receive a music file is shown in FIG. 4. Similar to the process for the sending player, the receiving player participates in establishment of a no-host, peer-to-peer connection at 50. The initial transfer signals indicating an imminent file transfer are received at 52. The receiving player then transmits a preference for reception of the file at 54. This may include other parameters, such as transfer protocols, speed of the file transfer, but may also include a positive or negative indication of the willingness or readiness to receive files. If the response to receiving files is positive, the files are received at 56. If the response is negative at 54, the process ends at 60.

As mentioned above, the file may occur in accordance with established protection guidelines for digital content. In the secure transaction example, the establishment of the peer-to-peer connection will include a sub-step 58 that includes authentication and exchange of cryptographic session keys. In addition, if the files received are secure files, the receiving player must receive authentication at 62. Without the authentication, the secure files will be inaccessible to the receiving player 62.

In this manner, transfer of music files can occur between digital music players without the use of a host. Referring back to the digital music player of FIG. 1, the music player may include a controller or processor 24 that manages these processes, in addition to management of the security and protection protocols. In addition, the player may include communication software in the memory 22 that can be executed by the processor or controller 24. The communication software may be used to establish communication in accordance to one of several various communication protocols. However, the music player may be configured by a host prior to any file transfer, and the transfer may be in accordance with a preset protocol.

Thus, although there has been described to this point a particular embodiment for a method and apparatus for sharing of music files between music players without a host, it is not intended that such specific references be considered as limitations upon the scope of this invention except in-so-far as set forth in the following claims.

What is claimed is:

1. A digital music player, comprising: ECH
   a) a memory operable to store music files;
   b) a user interface operable to allow a user to select and access the music files;
   c) a decoder operable to convert selected music files into audio signals;
   d) a port operable to allow the user to establish a no-host connection to other digital music players; and
   e) a processor configured to mark and delete any of the music files transmitted across tie no-host connection.

2. The music player of claim 1, wherein the music player includes communication software that, when executed, allows the user to transfer music files to other users through the port.

3. The music player of claim 1, wherein the music player includes an audio output operable to make the audio signals audible.

4. The music player of claim 1, wherein the port is an infrared port.

5. The music player of claim 1, wherein the port is a USB port.

6. The music player of claim 1, wherein the decoder is an MP3 decoder.

7. The music player of claim 1, wherein the decoder is a digital-to-analog converter and the audio signals are analog.

8. A method for sending music files from a sending music player, the method comprising:
   a) establishing a no-host peer-to-peer connection with a receiving music player through a port;
   b) selecting at least one file on the sending music player;
   c) notifying the receiving music player of an imminent file transfer;
   d) receiving signals from the receiving music player indicating readiness to receive music files;
   e) transmit at least one selected file from the sending music player through the port over the no-host peer-to-peer connection; and
   f) marking and deleting any transmitted files and transmitting a final authentication key to the receiving music player.

9. The method of claim 8, wherein establishing a peer-to-peer connection farther comprises establishing cryptographic session keys for the transfer of secure musical content.

10. The method of claim 8, wherein transmitting is performed across a secure authentication channel.

11. The method of claim 8, wherein the method further comprises authentication and validation of reception of the sent file to the sending music player.

12. The method of claim 8, wherein the method further comprises updating data on a local storage nodule wherein the data updated changes the reference count.

13. The method of claim 12, wherein establishing a peer-to-peer connection further comprises establishing cryptographic session keys for the transfer of secure musical content.

14. A method for receiving music files with a receiving music player, the method comprising:
   a) establishing a no-host peer-to peer connection with a sending music player through a port;
   b) receiving signals from the sending music player through the port indicating an imminent music file transfer;
   c) responding to the signals through the port indicating preferences for receiving music files;
   d) if the preferences for receiving are positive, receiving music files through the port;
   e) marking and deleting any files transferred through the port.

15. The method of claim 13, wherein the method further comprises receiving a final authentication key from the sending music player.

* * * * *

UNITED STATES PATENT AND TRADEMARK OFFICE
CERTIFICATE OF CORRECTION

PATENT NO. : 6,372,974 B1  Page 1 of 1
DATED : April 16, 2002
INVENTOR(S) : Gross et al.

It is certified that error appears in the above-identified patent and that said Letters Patent is hereby corrected as shown below:

Column 1,
Line 4, "he drawings" should read -- the drawings --;

Column 2,
Line 13, "(DR)" should read -- (IR) --;
Line 18, "maybe" should read -- may be --;
Line 38, ":user" should read -- user --;
Line 44, "may-have" should read -- may have --;

Column 4,
Line 16, "comprising: ECH" should read -- comprising: --;
Line 23, "across tie" should read -- across the --;
Line 47, "transmit" should read -- transmitting --;
Line 54, "farther" should read -- further --;
Line 62, "nodule" should read -- module --;

Column 5,
Line 3, "peer-to peer" should read -- peer-to-peer --.

Signed and Sealed this

First Day of July, 2003

JAMES E. ROGAN
*Director of the United States Patent and Trademark Office*